United States Patent [19]

Inagawa

[11] Patent Number: 4,970,545
[45] Date of Patent: Nov. 13, 1990

[54] IMAGE RETRIEVAL SYSTEM

[75] Inventor: Isao Inagawa, Tokyo, Japan

[73] Assignee: Fuji Photo Film Co., Ltd., Kanagawa, Japan

[21] Appl. No.: 458,465

[22] Filed: Dec. 28, 1989

[30] Foreign Application Priority Data

Dec. 28, 1988 [JP] Japan .................................. 63-333124

[51] Int. Cl.⁵ .............................................. G03B 13/28
[52] U.S. Cl. .......................................... 355/45; 355/41
[58] Field of Search ....................... 355/40, 41, 43, 45, 355/54, 77

[56] References Cited

U.S. PATENT DOCUMENTS

| | | | |
|---|---|---|---|
| 3,740,136 | 6/1973 | Maloney et al. | 355/45 X |
| 4,461,566 | 7/1984 | Plumadore | 355/45 |
| 4,603,966 | 8/1986 | Brownstein | 355/45 |
| 4,809,064 | 2/1989 | Amos et al. | 355/45 X |
| 4,866,476 | 9/1989 | Kogane et al. | 355/54 X |
| 4,873,552 | 10/1989 | Otsuki | 355/45 X |
| 4,908,657 | 3/1990 | Kogane | 355/54 X |
| 4,918,483 | 4/1990 | Otake | 355/54 X |

FOREIGN PATENT DOCUMENTS

49-27446 7/1974 Japan .
53-45635 11/1978 Japan .
58-22744 5/1983 Japan .

Primary Examiner—Richard A. Wintercorn
Attorney, Agent, or Firm—Sughrue, Mion, Zinn Macpeak & Seas

[57] ABSTRACT

An image retrieval system for retrieving a desired micro image from a film in the form of a roll on which partial images obtained by dividing a large image into a plurality of smaller units are recorded in a row in the form of micro images. The system includes a keyboard in which a plurality of keys are arranged in the form of a matrix in correspondence with the partial images; an image display sheet on which the large image is displayed on a reduced scale and which is placed on the keyboard; a retrieval device for retrieving the micro image of the partial image corresponding to a retrieval code inputted through the keyboard; and a projection device for projecting on an enlarged scale the micro image retrieved by the retrieval device. The operator retrieves a corresponding film image by operating a key of the keyboard while confirming a necessary partial image on the image display sheet, and the retrieved film image can be projected on an enlarged scale.

17 Claims, 7 Drawing Sheets

IMAGE RETRIEVAL SYSTEM

BACKGROUND OF THE INVENTION

1. Field of the Invention

The present invention relates to an image retrieval system which, through an input of a predetermined retrieval code thereto, is capable of retrieving an image corresponding to the retrieval code from a film in the form of a roll and of projecting or copying the retrieved image.

2. Description of the Related Art

Recently, map retrieval systems have been conceived in which detailed maps (partial maps) of a specific area map are recorded in advance and which are adapted to retrieve and display a corresponding detailed map from among the prerecorded detailed maps by selecting that detailed map on a screen on which the entire specific area is displayed.

These conventional systems employ a digitizer for converting an arbitrary position on a plane into digitized coordinates and are arranged such that a map displaying the aforementioned entire specific area is placed on a flat surface of this digitizer, and a position corresponding to a detailed map to be retrieved is designated so as to detect an electric field, a magnetic field or the like by means of a cursor, thereby specifying that position. As a result, the detailed map can be retrieved quickly and can be displayed on the screen. As for a microfilm for recording an image, a microfiche is generally used in correspondence with a planar (two-dimensional) map.

However, the above-described extended systems for microfilm retrieval and optical disk systems are inappropriate as systems applied to small-scale areas in terms of price and system control. In addition, there are drawbacks in that, since the systems are designed for versatile operations, the systems are provided with unnecessary operating portions and the positions of operating portions necessary for map retrieval are dispersed, with the result that their operating efficiency is poor.

In addition, image recording apparatuses which are capable of easily recording images by photographing them in the frames of a microfilm in the form of a roll and of projecting the recorded images onto a screen or the like or copying them on copy paper are known from Japanese Patent Publication No. 22744/1983, U.S. Pat. No. 4,461,566, Japanese Patent Publication No. 27446/1974, Japanese Utility Model Publication No. 45635/1978, etc. The aforementioned apparatuses are arranged with a compact body, and have the advantage that documents can be microfilmed for storage and can retrieve a necessary document in a simple operation.

With these apparatuses, however, since the retrieval of a document is effected by the input of a predetermined retrieval code by means of keys, the apparatuses do not have the function of retrieving a detailed map through a designation on the aforementioned specific area map. Accordingly, the apparatuses cannot be applied as they are as map retrieving systems. In addition, since the film in the form of a roll is used, images can be recorded only in one row (one-dimensionally), so that a planar map as it is cannot be recorded planarly.

SUMMARY OF THE INVENTION

Accordingly, an object of the present invention is to provide an image retrieval system which is capable of selecting a partial image from a continuous large image of a map or the like through a simple key operation, and of retrieving and displaying the selected partial image, thereby overcoming the above-described drawbacks of the prior art.

To this end, in accordance with one aspect of the invention, there is provided an image retrieval system comprising: a loading section for loading a film in the form of a roll on which partial images obtained by dividing a large image into a plurality of smaller units are recorded in a row in the form of micro images; a keyboard in which a plurality of keys are arranged in the form of a matrix; an image display sheet on which the large image is displayed on a reduced scale and which is placed on the keyboard; retrieval means for retrieving the micro image of the partial image corresponding to a retrieval code inputted through the keyboard; projection means for projecting on an enlarged scale the micro image retrieved by the retrieval means; and copying means for copying the micro image on an enlarged scale.

According to this aspect of the invention, since a continuous large image is displayed on a reduced scale on the image display sheet, the operator is able to readily ascertain which partial map is to be designated. The scale of this reduction is of such a measure that allows the operator to engage in desk work. Since keys are arranged on respective partial images on the keyboard, the operator is able to designate a desired partial image by operating one of these keys. By means of the key thus operated, a retrieval code corresponding to the key is supplied, and the retrieval means retrieves a partial image corresponding to the retrieval code. Upon completion of the retrieval, that partial image can be projected by the projection means. In addition, the projected image can be copied on copy paper or the like by operating the copying means.

Thus, since the image display sheet on which the large image is displayed on a reduced scale is placed on the keyboard with the plurality of keys arranged therein, it is possible to confirm and designate a partial image from the microfilm in the form of a roll on which partial images are recorded in a row. Thus, the image retrieval system in accordance with the present invention can be provided with a map retrieval function for retrieving a detailed partial map from the map of a specific area and for projecting the same on an enlarged scale.

In accordance with another aspect of the invention, the image retrieval system further comprises computing means for computing the retrieval code by changing an X-direction retrieval code and a Y-direction retrieval code separately, the X-direction retrieval code and the Y-direction retrieval code being obtained by dividing the retrieval code into two codes of X-Y coordinate axes.

According to this aspect of the invention, since an applicable retrieval code is divided into two sub-codes which are used as the X-direction retrieval code and the Y-direction retrieval code, when a designation key is operated at the time of selecting an adjacent partial image of the reduced-scale large image placed on the keyboard, and the applicable retrieval code is computed by the computing means, it is possible to effect processing by a simple arithmetic operation (e.g., a simple addition or subtraction if the retrieval code is a numeral), thereby making it possible to reduce the retrieval speed.

Another object of the invention is to provide an image retrieval system which is capable of displaying a large image and designating which partial image of the large image has been selected.

To this end, in accordance with still another aspect of the invention, the image retrieval system further comprises display means which include a display panel on which the large image is recorded and designation means disposed on the display panel and adapted to designate a position on the display panel corresponding to the partial image selected on the image display sheet.

According to this aspect of the invention, since a partial image designated on the keyboard can be designated on the display panel by the designation means, it is possible to recognize an erroneous key operation or the like, and the operation of shifting to an adjacent partial image can be facilitated.

The above and other objects, features and advantages of the invention will become more apparent from the following detailed description of the invention when read in conjunction with the accompanying drawings.

DESCRIPTION OF THE PREFERRED EMBODIMENTS

Figure 1:
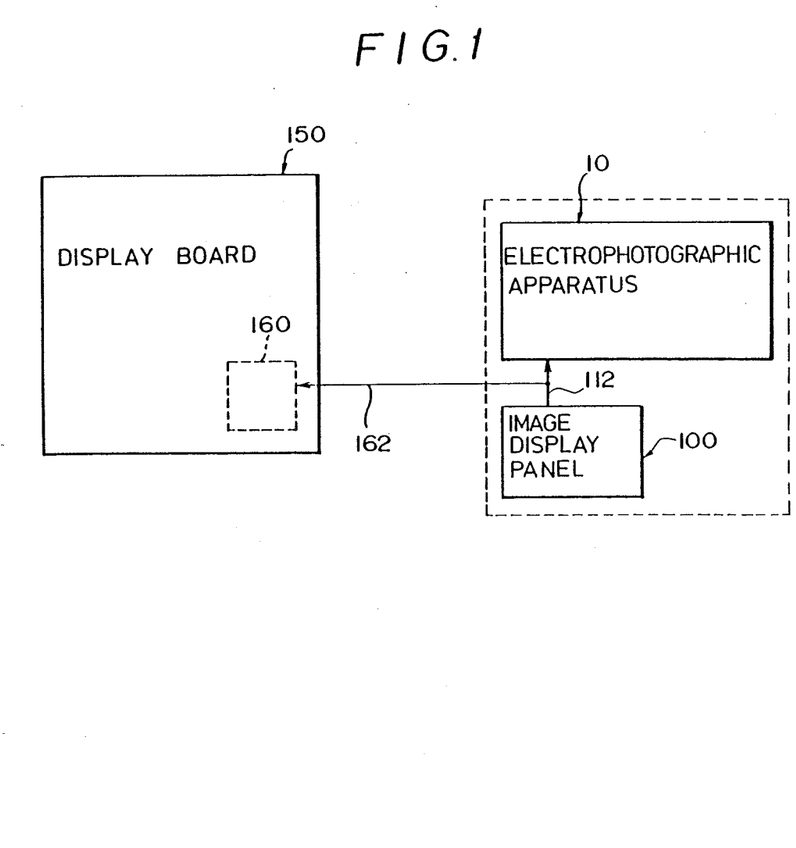
FIG. 1 is a schematic diagram of an image retrieval system in accordance with an embodiment of the present invention.

FIG. 1 is a schematic diagram of an image retrieval system in accordance with an embodiment of the present invention. This image retrieval system comprises an electrophotographic apparatus 10, an image display panel 100 serving as a keyboard, and a display board 150.

Figure 2:
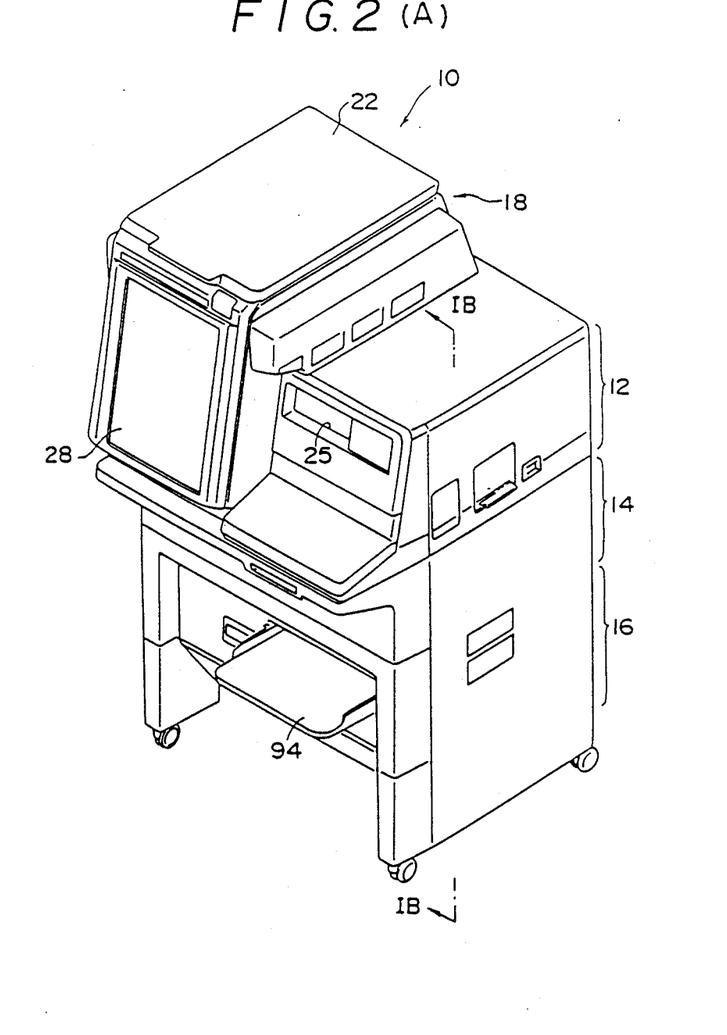
FIG. 2A is a perspective view of an electrophotographic apparatus to which the embodiment is applied.
FIG. 2B is a side-elevational view of the electrophotographic apparatus shown in FIG. 2A.
Figure 2B:
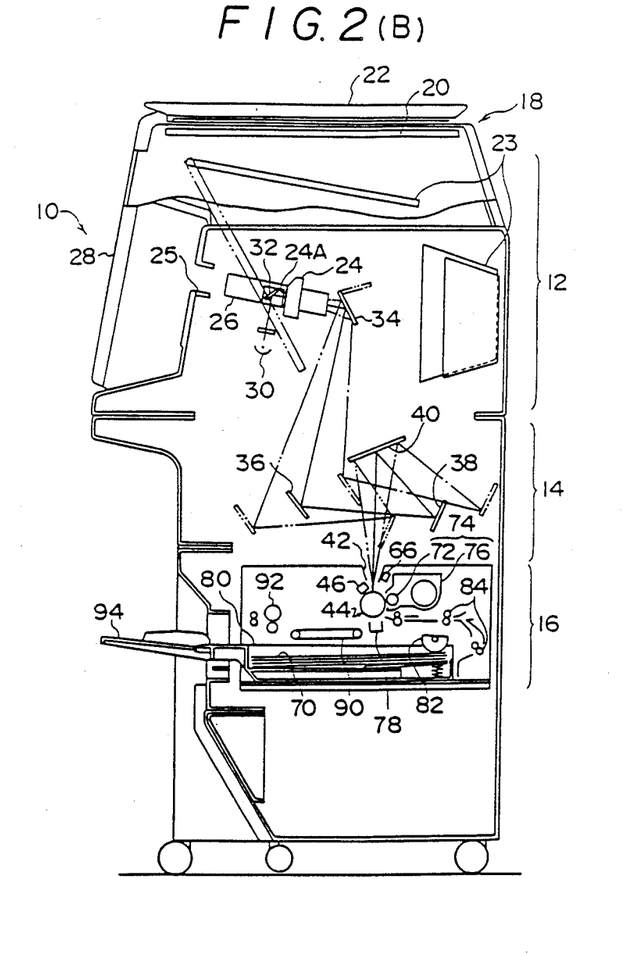

As shown in FIGS. 2A and 2B, the electrophotographic apparatus 10 comprises a recording and projecting station 12, a scanning station 14, and a copying station 16, a document table 18 being disposed on the top thereof. The document table 18 has a transparent glass panel 20 on which a document is placed and a holding plate 22 which closes in such a manner as to press the document against the glass panel 20. The holding plate 22 is rotatable about one end thereof, and is adapted to be opened when the document is taken out.

An image recorded on the document is reduced by an optical system 23 and is directed to a process head 24. It should be noted that an image in this embodiment is a partial image of a specific area map (see FIG. 4) which constitutes a large image. In this partial image, an area thereof is recorded in greater detail than the specific area map by means of illustration.

A cassette 26 is loaded from a cassette loading portion 25 into a head portion 24A of the process head 24, to which a film wound around a pair of reels (neither are shown) inside the cassette 26 corresponds. In the head portion 24A, the imagewise exposure of the film, development, fixing, and drying are carried out as the film moves from one reel to the other, and images thus formed are recorded on the film in a row (one-dimensionally). At the time of recording, retrieval codes are attached to the respective images by operating a ten key keyboard 27 (see FIG. 4). This retrieval code is composed of a four-digit numeral, the first two digits being used as an X-direction retrieval code for the aforementioned specific area map, and the last two digits as a Y-direction retrieval code therefor.

The image recorded on the film can be projected on an enlarged scale onto a screen 28. In other words, an arrangement is provided such that a light source 30 and a mirror 32 are disposed on the left-hand side of the film as viewed in FIG. 2B, and rays of light emitted from the light source 30 are applied to the image on the film via the mirror 32, an image transmitted therethrough being guided to the screen 28 by making use of parts of the optical system 23.

In addition, the image recorded on the film can be copied. That is, a mirror 34 is disposed on an optical axis leading from the projected image from the film to the screen 28. This mirror 34 is rotatable about an upper end thereof as viewed in FIG. 2B and, during projection onto the screen 28, the mirror 34 is held in a horizontal state, as shown by a two-dotted chain line in FIG. 2B, by means of a driving force of an unillustrated driving means. Meanwhile, during copying, the mirror 34 is rotated clockwise as viewed in FIG. 2B about the upper end thereof and is inclined by approximately 45° as shown by the solid line. As a result, the rays of light leading from the process head 24 are guided to the scanning station 14 below the recording and projecting station 12.

The scanning station 14 comprises movable first and second mirrors, 36, 38, and a fixed third mirror 40. The first and second mirrors 36, 38 are movable transversely as viewed in FIG. 2B without their relative positions being changed. The first mirror 36 is inclined with its reflecting surface facing a rearwardly upward portion of the electrophotographic apparatus, while the second mirror 38 is inclined with its reflecting surface facing a forwardly upward portion of the electrophotographic apparatus.

As the first and second mirrors 36, 38 are moved from the left-hand side to the right-hand side as viewed in FIG. 2B, line scanning is effected by means of the light from the mirror 34, consecutively guiding the light to the third mirror 40. The light reflected by the third mirror 40 is focused at a position indicated by arrow B in FIG. 3 on a peripheral surface of a photosensitive drum 44 via an incidence port 42 of the copying station 16.

Figure 3:
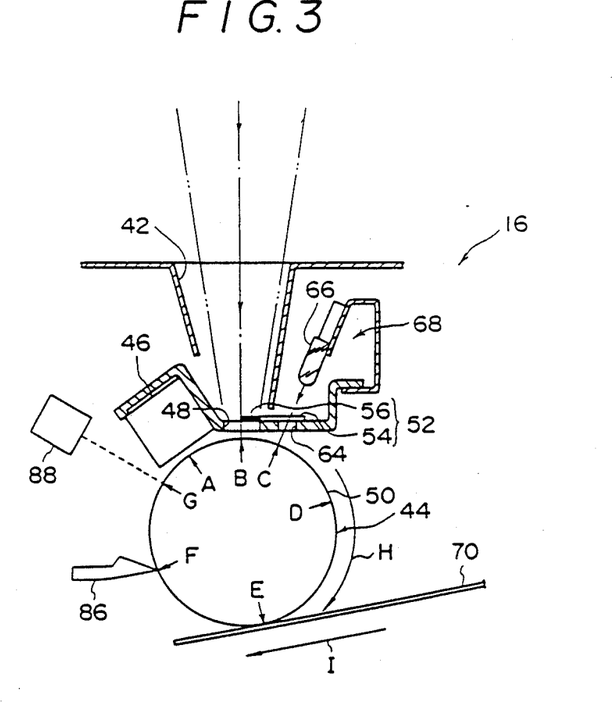
FIG. 3 is an enlarged view of a photosensitive drum of a copying station and its vicinity.

At this time, the photosensitive drum 44 is rotated clockwise as viewed in FIG. 3, (in the direction of arrow H) in synchronization with the line scanning with the light. A corona charger 46 is disposed upstream of the position of arrow B where the light is focused and in correspondence with the position of arrow A shown in FIG. 3. Through the charging action of this corona charger 46, charges are imparted to the overall surface of a photosensitive body 50.

A bottom portion of the incidence port 42 is formed into a configuration of a slit, forming an exposure slit 48. As a result, with excess rays of light shielded, the light is focused for each fixed width onto the photosensitive body 50 coated on the photosensitive drum 44.

A light source 66 is disposed at a position indicated by arrow C in FIG. 3 downstream of the focusing position (the position of arrow B in FIG. 3) via a charge eliminating slit 64, these members constituting a charge eliminating section 68. The rays of light emitted from this light source 66 pass through the charge eliminating slit 64 and are adapted to be applied to the photosensitive body 50. These rays of light serve to eliminate excess charges on the photosensitive body 50 and are designed to mainly eliminate charges corresponding to forward and rearward ends of recording paper 70 which will be described below.

A development roller 72 is held in contact with the photosensitive body 50 downstream of the charge eliminating section 68, as shown in FIG. 2B (see the position indicated by arrow D in FIG. 3). The development roller 72 constitutes a part of a developing section 74 and is adapted to guide a developing agent (toner particles) inside a developing tank 76 to the photosensitive body 50. As a result, an electrostatic latent image formed on the photosensitive body 50 is converted into a visible image.

A corona charger 78 for transfer is disposed downstream of the developing section 74 (at the position indicated by arrow E in FIG. 3), and the recording paper 70 is clamped by the corona charger 78 for transfer and the photosensitive drum 44 and is conveyed in the direction of arrow I shown in FIG. 3. By virtue of the action of this corona charger 78 for transfer, the developing agent adhering to the photosensitive body 50 is transferred onto the recording paper 70.

As for the recording paper 70, the arrangement is such that only the uppermost sheet of the recording paper 70 stacked on a paper supply tray 80 disposed below the photosensitive drum 44 is fetched by the rotation of a paper feed roller 82 having a crescent-shaped section. The recording paper 70 thus fetched is then guided by guide rollers 84 and conveyed between the photosensitive drum 44 and the corona charger 78 for transfer. This conveying speed is synchronized with the rotational speed of the photosensitive drum 44.

In addition, disposed respectively on the photosensitive drum 44 at the positions indicated by arrows F and G in FIG. 3 are a cleaning section 86 and an overall-surface charge eliminating section 88, which are adapted to clean the surface of the photosensitive body 50, by means of which copying on the recording sheet 70 has been completed, and to eliminate all the residual charges.

As described above, the arrangement is such that, in the copying station 16, as the photosensitive drum 44 is rotated one turn, the respective processes of charging, exposure, elimination of charges at paper ends, development, transfer, cleaning, and elimination of charges from the overall surface are carried out at the positions indicated by arrows A to G in FIG. 3, thereby allowing the image recorded on the film to be copied on the recording paper 70. After copying, the recording paper 70 is discharged onto a paper receiving tray 94 via a conveyor belt 90 and a heat roller 92 for fixing.

Figure 4:
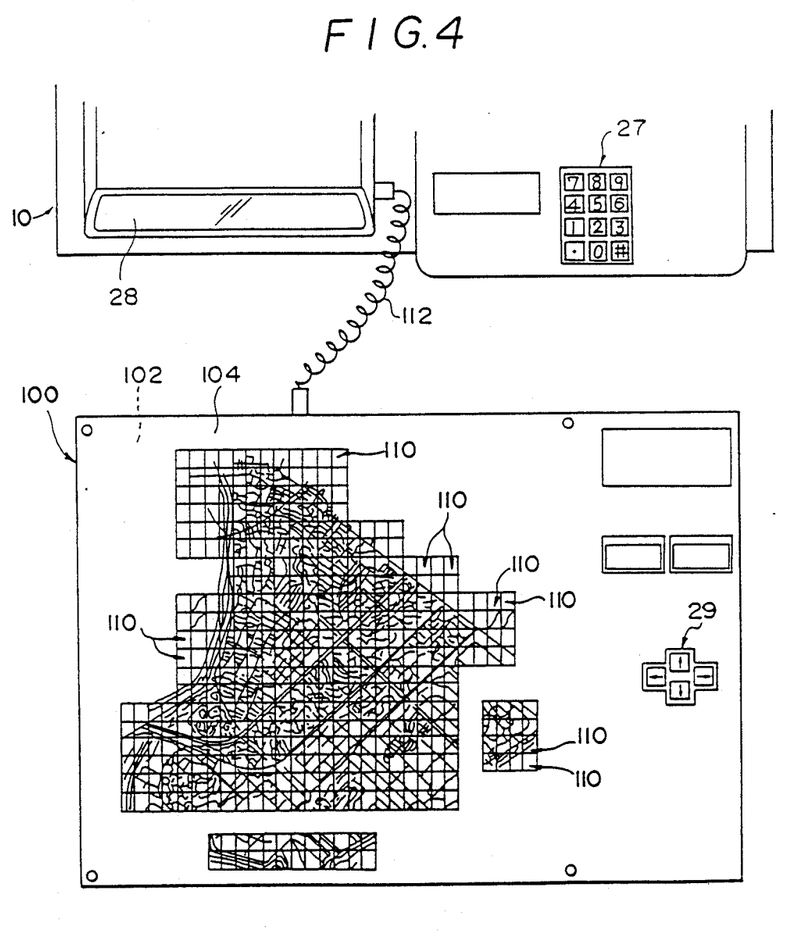
FIG. 4 is a top plan view of an image display panel.

Referring now to FIG. 4, a description will be given of an arrangement of the image display panel 100. The image display panel 100 is mounted on a desk in front of the electrophotographic apparatus 10. This image display panel 100 has a flat surface 102, and about 1,200 switches (not shown) formed into a grid having meshes of 3.6 mm×3.6 mm or thereabouts are arranged inwardly of this flat surface 102 in the X-Y direction, thereby constituting a touch panel, i.e., a keyboard. If the flat surface 102 is pressed with a touch pen or the like, an electric current of a different value is adapted to flow as the switches are pressed. A sheet 104 on which the map of the aforementioned specific area has been recorded on a reduced scale is placed on the flat surface 102.

The sheet 104 is provided with ruled lines in the form of a grid, and boxes 110 corresponding to the aforementioned switches are thereby formed and are used as the keys in accordance with the present invention. An unillustrated A/D converter is incorporated in the image display panel 100, and is adapted to convert an analog value of the current with the switch operated in a conductive state into a digital value. A digital value thus obtained corresponds to the aforementioned retrieval code, which is supplied to the electrophotographic apparatus 10 via a connecting cord 112. As a result, by pressing a given box 110 with the touch pen, it is possible to designate a specific partial image among a plurality of partial images. The retrieval code of the designated partial image is also supplied from this image display panel 100 to the display board 150 which will be described later.

It should be noted that arrow keys 29 (see FIG. 4) are provided in the vicinity of the touch panel as movement-designating keys for projecting an image in the X-Y direction of the image projected on the screen 28.

Figure 5:
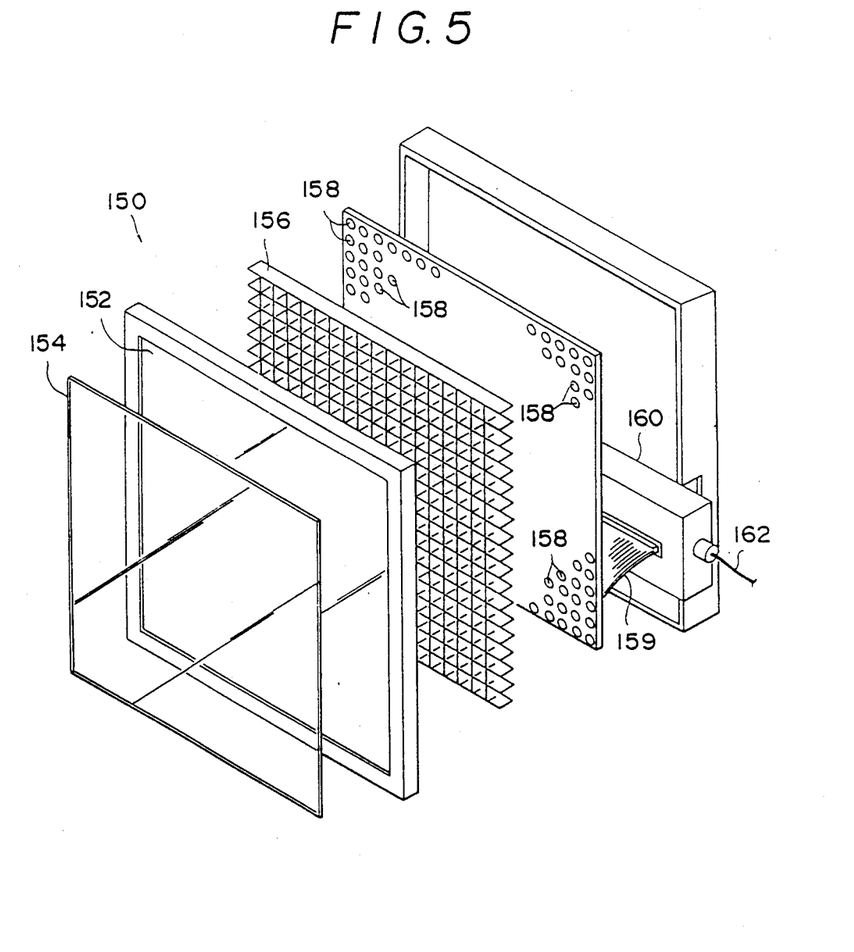
FIG. 5 is a front elevational view of a display board.

As shown in FIG. 5, the display board 150 has a size of 2 m×2 m or thereabouts, the size being of such a measure that allows not only the operator to view an image personally but also a plurality of people concerned to view it simultaneously. The display board 150 has a semitransparent panel 152, and a semitransparent board 154 is attached to the surface of the panel 152. A map which is identical with the one placed on the image display panel 100 and is enlarged in correspondence with the area of the panel 152 is recorded on the semitransparent board 154.

Disposed on the rear side of the panel 152 is a grid-like shielding plate 156 forming space portions having the same arrangement as the aforementioned boxes 110. The space portions partitioned by the grid-like shielding plate 156 are respectively provided with lamps 158. Power supply lines 159 for the lamps 158 are respectively connected to a lamp control section 160. A signal line 162 from the image display panel 100 is also connected to the lamp control section 160 to allow the retrieval code to be inputted thereto.

In the lamp control section 160, the lamp 158 corresponding to this input retrieval code is adapted to be lit. When the lamp 158 is lit, its light rays are transmitted through the panel 152 and the board 154 and are capable of illuminating only the area corresponding to the box 110 designated on the image display panel 100.

The operation of this embodiment will be described hereinunder.

First, a description will be given of the basic operations of the electrophotographic apparatus 10, including recording on the film, the projection of the image recorded on the film onto the screen 28, and the copying of the image projected on the screen.

In the case of recording an image on the film, the document, on which the image to be recorded has been recorded, is placed on the document table 18, and the holding plate 22 is closed. The image recorded on the document is reflected by rays of light from the light source, is reduced via the optical system 23, and is led to the process head 24. The cassette 26 is loaded in the head portion 24A of the process head 24 with a film surface disposed in such a manner as to correspond to the head portion 24A. As a result, the film is imagewise exposed to light, and the takeup reel of the cassette 26 is then rotated. As the film is hence moved from one reel to the other, processes of development, fixing, and drying are consecutively carried out, thereby recording images. At this juncture, the ten key keyboard 27 is operated, and the retrieval codes corresponding to the images are attached to the images, respectively.

In the case of projecting an image recorded on the film onto the screen 28, rays of light from the light source 30 are applied to the mirror 32 disposed on the side of the film which is remote from the side opposed to the head portion 24A, and are reflected by this mirror 32, thereby allowing the rays of light to be transmitted through the image recorded on the film. The transmitted rays of light advance by means of the optical system 23 in a direction opposite to that in the above-described case of recording on the film and are enlarged so as to be projected onto the screen 28. A switch of a guide for the document table 18 and the screen 28 can be readily effected by rotating one member of the optical system 23 so as to change the direction of reflection.

In the case of copying an image recorded on the film, the mirror 34 is inclined to a position shown by the two-dotted chain line in FIG. 2B. As a result, the rays of light transmitted through the film are guided to the scanning station 14 by means of this mirror 34, and line scanning is effected as the first and second mirrors 36, 38 of the scanning station 14 move, allowing the light of the image to be reflected in the direction toward the third mirror 40 consecutively starting from one side of the image to the other. The light reflected by the third mirror 40 is led to the incidence port 42 of the copying station 16, passes through the exposure slit 48, and is focused onto the photosensitive body 50 on the photosensitive drum 44.

The photosensitive body 50 has its entire surface charged at the position indicated by arrow A in FIG. 3, and charges only at the portion where the light is applied at the position indicated by arrow B in FIG. 3 are eliminated. The photosensitive drum 14 is rotated clockwise, and charges are eliminated at the position indicated by arrow C in FIG. 3, and development processing is effected at the position indicated by arrow D in FIG. 3. In this development processing, the developing agent in the developing tank 76 is guided to the photosensitive body, and adheres to a portion of the photosensitive body charged with a different polarity.

At the position indicated by arrow E in FIG. 3, the adhering developing agent is transferred onto the recording paper 70 by the corona charger 78 for transfer to effect copying. The recording paper 70 on which a copy has been made is guided by the conveyor belt 90, is fixed by the heat roller 92, and is discharged onto the receiving tray 94, thereby obtaining a copied image.

Figure 6:
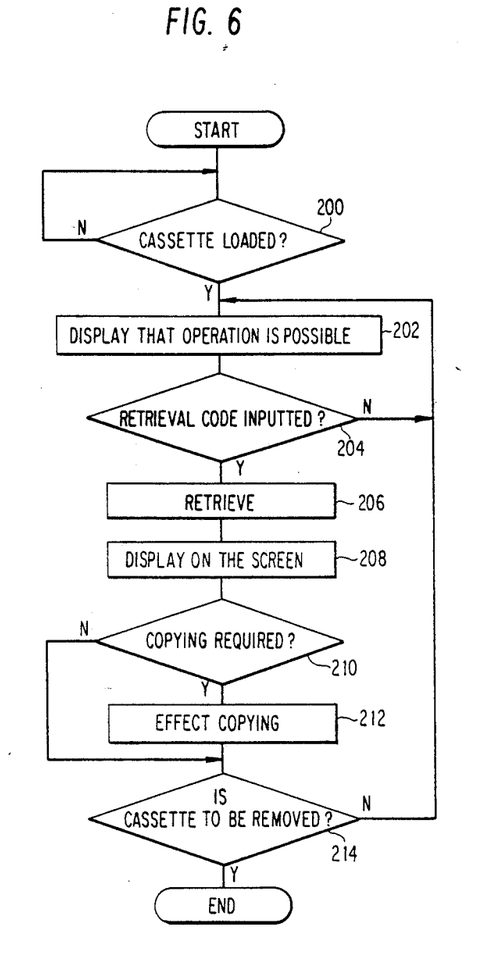
FIG. 6 is a control flowchart of the image retrieval system.

Referring now to the flowchart shown in FIG. 6, the operation of this system as a map retrieval system will be described hereinunder.

First, in Step 200, a determination is made as to whether or not the cassette 26 has been loaded. If YES is the answer, the operation proceeds to Step 202 to display that operation is possible. Then, the operation proceeds to Step 204 to determine whether or not a retrieval code has been inputted. If NO is the answer, the operation returns to Step 202.

As for the retrieval code, if one of the boxes 110 on the sheet 104 placed on the flat surface 102 of the image display panel 100 is selected and pressed with the touch pen, a current of a predetermined current value flows. This analog current value is converted into a digital value (retrieval code) by the A/D converter, and the digital value is supplied to the electrophotographic apparatus 10 and the display board 150. At this juncture, if it is determined in Step 104 that the digital value has been inputted, the operation proceeds to Step 206 to retrieve a corresponding image from the film in the form of a roll on the basis of that retrieval code. Namely, in the electrophotographic apparatus 10, the retrieval code inputted from the image display panel 100 is controlled by regarding that that retrieval code is identical with a one inputted by operating the ten key keyboard 27 provided on the electrophotographic apparatus 10 itself.

In addition, at the same time as this operation, this retrieval code is also outputted from the image display panel 100 to the display board 150 via the signal line 162, causing a corresponding one of the lamps 158 to be lit by the lamp control section 160 of the display board 150. As a result, the light of the lamp 158 is transmitted through the panel 152 and the board 154, thereby making it possible to illuminate only the position corresponding to the box 110 designated on the image display panel 100.

In an ensuing Step 208, the retrieved image is projected onto the screen 28. As a result, an enlarged view of the map falling within the designated box 110 can be obtained. It should be noted that the image of the map projected on the screen 28 is one illustrated in advance, and since it is not a mere enlarged view of the entire area map on the image display panel 100, it is possible to obtain a detailed map of a sub-area falling within that box 110.

At this juncture, if it is determined as a result of confirming the detailed map projected on the screen 28 that a detailed map adjacent to that of the aforementioned box 110 is necessary, that detailed map is retrieved by operating one of the arrow keys 29 provided on the image display panel 100. If this arrow key 29 is operated, the computing means of the electrophotographic apparatus computes a corresponding retrieval code.

Since the retrieval code of this embodiment is applied as coordinates in the X-Y direction by dividing a four-digit numeral into the first two digits and the last two digits, even if the sequence recorded on the actual film in the form of a roll is random, it is possible to readily obtain a retrieval code. For instance, when an downwardly oriented key as viewed in FIG. 4 is operated among the arrow keys 29, the X-direction retrieval code remains unchanged, while the numeral of the Y-direction retrieval code is subtracted by 1, thereby permitting a retrieval code to be obtained readily. When a rightwardly oriented key as viewed in FIG. 4 is operated, 1 is added to the X-direction retrieval code, while the Y-direction retrieval code remains unchanged, thereby similarly permitting a retrieval code to be obtained readily.

In an ensuing Step 210, if copying is required, the operation proceeds to Step 212 to effect copying in the above-described procedure. If copying is not required, the operation jumps this Step 212, and a determination is made as to whether or not the cassette 26 has been removed. If the cassette is still loaded, the operation returns to Step 202, and if it has been removed, the operation is ended.

It should be noted that although in this embodiment the present invention is applied to a map retrieval system, the invention can also be applied to a simple educational system in which the electrophotographic apparatus 10 provided with the image display panel 100 is disposed on a teacher's desk, while electrophotographic apparatuses used exclusively for retrieval are provided on students' desks and are respectively connected to the electrophotographic apparatus 10 on the teacher's desk, and a program is adapted to be designated from an educational program menu by means of the image display panel 100.

As described above, the image retrieval system in accordance with the present invention offers an outstanding advantage that by selecting a partial image from a continuous large image of such as a map through a simple operation of a key, the selected partial image can be readily retrieved and displayed.

In addition to the aforementioned advantage, the present invention has an additional advantage that since a large image can be displayed on the display board, it is possible designate which partial image of the large image has been selected.

What is claimed is:

1. An image retrieval system comprising:
 a loading section for loading a film in the form of a roll on which partial images obtained by dividing a large image into a plurality of smaller units are recorded in a row in the form of micro images;
 a keyboard in which a plurality of keys are arranged in the form of a matrix;
 an image display sheet on which said large image is displayed on a reduced scale and which is placed on said keyboard;
 retrieval means for retrieving said micro image of said partial image corresponding to a retrieval code inputted through said keyboard;
 projection means for projecting on an enlarged scale said micro image retrieved by said retrieval means; and
 copying means for copying said micro image on an enlarged scale.

2. An image retrieval system according to claim 1, further comprising computing means for computing said retrieval code by changing an X-direction retrieval code and a Y-direction retrieval code separately, said X-direction retrieval code and said Y-direction retrieval code being obtained by dividing said retrieval code into two codes of X-Y coordinate axes.

3. An image retrieval system according to claim 2, further comprising recording means for recording said partial images on said film in the form of a roll.

4. An image retrieval system according to claim 3, further comprising retrieval code attaching means for attaching a corresponding one of said retrieval codes to said partial image.

5. An image retrieval system according to claim 4, wherein said computing means has an arrangement for computing said retrieval code of said partial image adjacent to said partial image projected on an enlarged scale by said projection means.

6. An image retrieval system according to claim 1, further comprising display means for displaying said large image.

7. An image retrieval system according to claim 6, wherein said display means comprises a display panel on which said large image is recorded and designation means for designating a position on said display panel corresponding to said partial image selected on said image display sheet.

8. An image retrieval system according to claim 7, wherein said designation means comprises a defining member for defining a portion of said large image displayed on said display panel, said portion corresponding to said partial image; and a lamp for effecting designation by applying light to said portion of said large image defined by said defining member.

9. An image retrieval system according to claim 8, wherein said display panel is formed of a transparent material, and said defining member is formed of a light-shielding material, said defining member and said lamp being disposed on the rear side of said display panel.

10. An image retrieval system comprising:
 recording means for allowing partial images obtained by dividing a large image into a plurality of smaller units in the form of a matrix to be recorded in a row on a microfilm in the form of micro images;
 a keyboard in which a plurality of keys are arranged in the form of a matrix in correspondence with said partial images;
 an image display sheet on which said large image is displayed on a reduced scale and which is placed on said keyboard;
 retrieval means for retrieving said micro image of said partial image corresponding to a retrieval code inputted through said keyboard;
 projection means for projecting on an enlarged scale said micro image retrieved by said retrieval means; and
 copying means for copying said micro image on an enlarged scale.

11. An image retrieval system according to claim 10, further comprising retrieval code attaching means for attaching said retrieval code to said partial image.

12. An image retrieval system according to claim 11, further comprising computing means for computing said retrieval code of said partial image of said large image adjacent to said partial image projected on an enlarged scale by said projection means.

13. An image retrieval system according to claim 12, wherein said computing means is arranged in such a manner as to compute said retrieval code by changing an X-direction retrieval code and a Y-direction retrieval code separately, said X-direction retrieval code and said Y-direction retrieval code being obtained by dividing said retrieval code into two codes of X-Y coordinate axes.

14. An image retrieval system according to claim 13, further comprising display means for displaying said large image.

15. An image retrieval system according to claim 14, wherein said display means comprises a display panel on which said large image is recorded and designation means for designating a position on said display panel corresponding to said partial image selected on said image display sheet.

16. An image retrieval system according to claim 15, wherein said designation means comprises a defining member for defining a portion of said large image displayed on said display panel, said portion corresponding to said partial image; and a lamp for effecting designation by applying light to said portion of said large image defined by said defining member.

17. An image retrieval system according to claim 16, wherein said defining member is constituted by a shielding plate in the form of a grid corresponding to said partial images, and said display panel is formed of a transparent material, said shielding plate and said lamp being disposed on the rear side of said display panel.

* * * * *